United States Patent [19]

Hurst

[11] Patent Number: 4,533,938
[45] Date of Patent: Aug. 6, 1985

[54] COLOR MODIFIER FOR COMPOSITE VIDEO SIGNALS

[75] Inventor: Robert N. Hurst, Cherry Hill, N.J.

[73] Assignee: RCA Corporation, Princeton, N.J.

[21] Appl. No.: 451,432

[22] Filed: Dec. 20, 1982

[51] Int. Cl.³ .......................................... H04N 9/535
[52] U.S. Cl. ........................................ 358/27; 358/28
[58] Field of Search ................. 358/28, 80, 29, 76, 358/27, 22

[56] References Cited

U.S. PATENT DOCUMENTS

| | | | |
|---|---|---|---|
| 2,799,722 | 7/1957 | Neugebauer | 358/80 |
| 3,525,802 | 8/1970 | Whiteneir, Jr. | 358/28 |
| 3,604,841 | 9/1971 | Ettlinger | 178/5.4 R |
| 3,663,744 | 5/1972 | Harwood | 178/5.4 HE |
| 3,740,459 | 6/1973 | Okada | 358/28 |

OTHER PUBLICATIONS

Connelly, McMann & Smith "A Color Corrector for Encoded Video Signals" Conf. Publication G9, International Broadcasting Convention IBC-70, 1970, pp. 154–158.

*Primary Examiner*—Richard Murray
*Attorney, Agent, or Firm*—P. J. Rasmussen; P. M. Emanuel; R. G. Coalter

[57] ABSTRACT

Hue and saturation are modified in a composite video signal processor by detecting the phase of the chrominance signal component to determine if it possesses phase components at or near a predetermined phase angle. If such components exist, quadrature related saturation and hue modifying signals are added to the composite video signal in controlled proportions and polarities to provide a resultant composite video signal in which a specified color or range of colors is modified. The modifying signals are inhibited by a masking unit to confine the color modification to predetermined areas of the displayed color image. Specific picture locations where color changes occur are identified by substituting an AC signal within the luminance frequency band for the color modifying signals. A desaturation signal derived from the hue modifying signals is added to the composite video signal to minimize changes in saturation level of the composite video signal as hue is changed.

15 Claims, 5 Drawing Figures

COLOR MODIFIER FOR COMPOSITE VIDEO SIGNALS

Field of the Invention

This invention relates to video signal processing apparatus and particularly to apparatus for modifying the hue and/or saturation level of the chrominance component of a composite video signal.

Background of the Invention

In certain applications it would be desirable to modify the hue and/or saturation level of specifically identifiable colors conveyed by the chrominance component of a composite video signal. One such application is in the post-production processing of video signals (e.g., tape-to-tape transfers, tape-to-disc transfers, etc.) where the source signal may be of generally acceptable quality but, for subjective reasons, it is desired to alter the hue or saturation level of one specific color over a limited range without altering other colors or the overall color balance of the processed composite video output signal. The problem of selective color modification is complicated by the need to maintain the highest possible quality of the processed signal which militates against the use of conventional demodulation-remodulation processing techniques. This problem may be more fully appreciated by considering the following two specific examples of chrominance signal processors.

In U.S. Pat. No. 3,663,744 of Harwood it is proposed that selective tint (e.g., flesh-tone) correction be provided in a color television receiver by altering the phase of the color subcarrier reference signal before application thereof to the receiver color demodulators. Phase alteration is accomplished by monitoring the chrominance signals to determine whether they possess phase components about the "flesh axis". If such components exist, a color correction signal is vectorially added to the color subcarrier reference oscillator signal to provide a new phased oscillator signal which, when applied to the receiver demodulators, causes them to provide color signals representative of flesh-tone. As noted by Harwood, the system may also be used at a transmitter by studio operators so that the transmitted picture has proper flesh-tone information. Harwood explains that this may be done by detecting those chrominance components which have phase angles about the +I axis and causing those components to be shifted to the I axis by appropriately altering the phase of the reference signal applied to the transmitter modulator.

Although well suited for receiver flesh-tone correction applications, the Harwood system has certain disadvantages as applied, for example, to certain post-production composite video signal color processing applications. One problem is that the Harwood system involves what may be termed "disassembly" of the composite video signal. Specifically, the composite signal is separated into luminance and chrominance components and the latter is demodulated to form R-Y, B-Y and G-Y color difference signals. Such disassembly is advantageous in a television receiver since the individual components are needed in separated form for application to a kinescope. In post-production video signal processing applications, however, the input and processed output signals are generally of composite video form. In such cases, the Harwood arrangement would necessarily involve disassembly, color processing and reassembly of the composite video signal. It would be desirable to avoid the steps of disassembly and reassembly which, generally speaking, tend to degrade the overall signal quality.

U.S. Pat. No. 3,604,841 of Ettinger entitled, "CORRECTION APPARATUS FOR ENCODED COLOR TELEVISION SIGNALS", which issued Sept. 14, 1971, describes a post production color processor which avoids the need for disassembly and reassembly of the composite video signal by adding color correction signals directly to the composite video signal. As Ettinger explains, red, green and blue black level correction may be achieved by adding to the NTSC signal constant chrominance signals with phase angles of 104, 241 and 347 degrees, respectively. In an embodiment of the Ettinger apparatus, correction is provided for red and blue black levels directly. A plus green black level correction is obtained by adding "minus" (e.g., inverted) red and blue correction signals to the composite signal. Color gain and gamma correction signals are obtained by demodulating the chrominance signal component to provide decoded blue and red signals which are then processed and remodulated on respective subcarriers of appropriate phase and added to the composite video signals. Notwithstanding these features, however, the Ettinger apparatus lacks the capability of altering the saturation and/or hue of specific colors without disturbance of other colors within a given scene.

Summary of the Invention

The present invention resides in part in recognition of the need for a composite video signal processor having the capability of altering the hue and/or saturation of a specifically indentifiable color or gamut (range) of colors of a composite video signal without disturbing the overall hue or saturation levels of other colors and without requiring disassembly and reassembly or the processed signal.

Apparatus embodying the invention includes first means for providing a color phase reference signal having a given phase angle with respect to the burst component of the composite video input signal and second means for providing a color identification signal when the phase angle of the chrominance component of the input signal lies within a predetermined range of the given phase angle. A third means, responsive to the color phase reference signal, provides a color modifying signal having quadrature related saturation and hue modifying components, each modifying component being of controllable amplitude and polarity. A fourth means couples the composite video input signal to an output terminal and adds the color modifying signal to the coupled signal when the color identification signal is present to provide a composite video output signal at the output terminal.

In accordance with another aspect of the invention, the apparatus includes a source for providing a color locating signal having a frequency different from that of the color phase reference signal and switch means for effectively substituting the color locating signal for the color modifying signal.

In accordance with yet another aspect of the invention, masking means are provided for effectively inhibiting the addition of the color modifying signal to the coupled signal during selected time periods of each field of the composite video input signal.

The foregoing and further features of the invention are described hereinafter and shown in the accompanying drawing wherein like elements are denoted by like reference designators and in which.

Detailed Description

Figure 1:
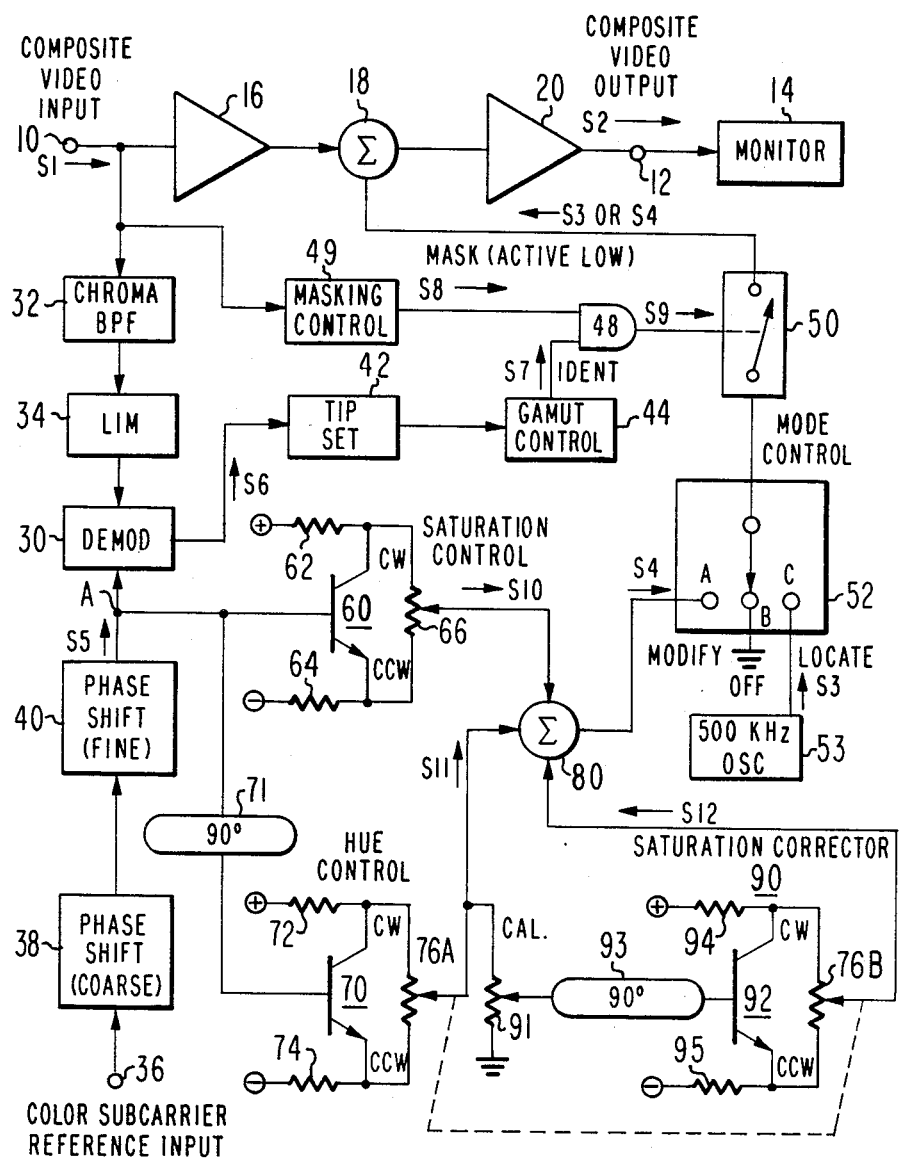
FIG. 1 is a block diagram, partially in schematic form, of chrominance signal processing apparatus embodying the invention.

The chrominance signal processing apparatus of FIG. 1 includes an input terminal 10 for receiving a composite video input signal, S1, and an output terminal 12 for providing a processed composite video output signal, S2, to a utilization means (e.g., a disc or tape recorder, etc., not shown) and to a monitor 14. The monitor 14 provides a display for verifying the location within a scene of specific colors to be modified in one operating mode (LOCATE) of the apparatus. In another operating mode (MODIFY), the monitor facilitates adjustment of the hue and saturation controls and displays the resultant processed signal. For this purpose the monitor 14 may be selectively coupled to terminals 10 and 12 via a suitable switch (not shown) for providing a direct comparison of the processed and unprocessed composite video signals.

Figure 5:
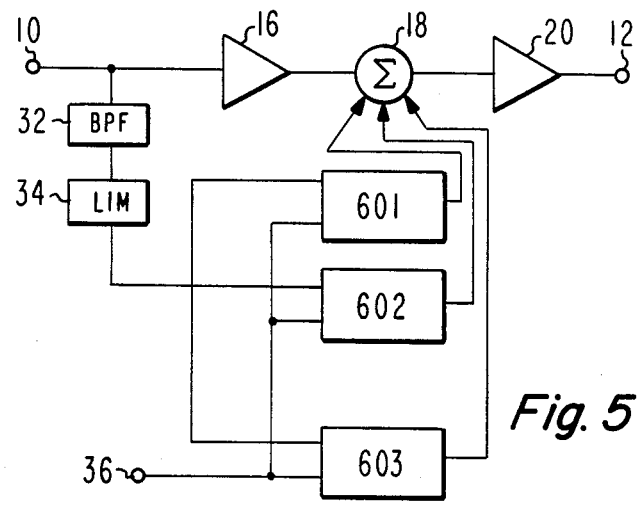
FIG. 5 is a block diagram illustrating a modification of the apparatus of FIG. 1.

Signal S1 is coupled from terminal 10 to terminal 12 via a main circuit path comprising, in the order named, an input buffer amplifier 16, a summing circuit 18 and an output buffer amplifier 20. The elements of the main circuit path are linear and non-frequency selective whereby the input signal S1 coupled via the path is not subjected to amplitude distortion, phase distortion or bandwidth limitation. Since the quality of the signal S1 is not degraded by the main signal path, it is possible to provide modification of two or more specific colors by connecting plural chrominance signal processors in cascade. An alternative, which accomplishes the same result with fewer circuit elements is discussed subsequently in connection with FIG. 5.

The function of summing circuit 18 is to linearly add a color locating signal S3 or a color modifying signal S4 to the coupled signal (S1) to form the output signal S2. Briefly speaking, the color locating signal S3 is of a frequency within the luminance signal band and is added in a timed relationship to the composite video input signal S1 so as to cause the composite video output signal S2 to exhibit an interference pattern (crosshatch) in areas of the images displayed on monitor 14 where color modification will take place. Signal S2 is then removed and the signal S4 is then added to signal S1 in the same timed relation as the signal S3 to effect the desired modification of the hue or saturation of the chrominance component of the composite video output signal.

Considering now the details of generation of signals S3 and S4, input terminal 10 is coupled to a first input of a demodulator 30 via a cascade connection (in the order named) of a chrominance signal bandpass filter 32 and a limiter 34. The other input of demodulator 30 is coupled to a color subcarrier reference signal input terminal 36 via a cascade connection of a "coarse" phase shift network 38 and a "fine" phase shift network 40. Networks 38 and 40 are selected to provide a total phase control range of 360 degrees at the color subcarrier frequency. Network 38 may comprise illustratively, a conventional tapped delay line having a delay of 30 degrees per tap for coarse phase control. Network 40 may comprise a resistance/capacitance all-pass active phase shift circuit having at least a 30 degree control range for providing fine phase adjustment. Filter 32 has a passband inclusive of the chrominance component of signal S1 and a stop band inclusive of the luminance component.

The function of networks 38 and 40 is to provide a color phase reference signal S5 at circuit node A (the second input of demodulator 30) having a given phase angle with respect to the color burst component of signal S1. To this end, terminal 36 would be coupled to a source of synchronizing signals having a fixed phase angle with respect to burst. Such a source, known as "house sync", is normally provided by a standard NTSC sync signal generator in post production studio facilities. If such a source is not available, an alternative would be to couple terminal 10 to the input of a conventional color burst phase locked loop (PLL) and couple the PLL output to terminal 36.

The function of filter 32 is to separate the chrominance component from the composite video input signal S1. Amplitude variations of the separated chrominance component are removed by limiter 34 whereby the output signal S6 of demodulator 30 (which may comprise a conventional four quadrant multiplier, e.g., the type 1496 integrated circuit) is representative of only the phase relationship between S5 and the limited chrominance signal (which represents hue) and is independent of the saturation level. The amplitude of signal S6 is a maximum where the phase of the chrominance component is equal to that of the color phase reference signal at node A and is a lesser value otherwise.

Signal S6, having an amplitude proportional to the hue (phase) of the chrominance component of signal S1, is applied via a tip set circuit 42 to an input of a gamut (color range) control circuit 44. Circuit 42 clamps the DC level of signal S6 to a uniform peak value and unit 44 provides variable threshold level detection of the peak or tip adjusted signal to produce a color identification signal S7. The signal S7 will be "high" or "active" whenever the phase of the chrominance component of the composite video input signal lies within a predetermined range of values of the color phase reference signal S5. This range of phase values corresponds to a range of hues and is controlled by adjustment of the threshold detection level of gamut control unit 44. One may thus lower the threshold to detect a broad range of colors at or near a specific phase angle as determined by the setting of networks 38 and 40 or one may raise the threshold level to detect a relatively narrow range of colors at or very near the phase of signal S5.

The color identification signal S7 (ACTIVE HIGH) is logically combined in an AND gate 48 with a masking control signal S8 (ACTIVE LOW) to form a control signal S9 for controlling a switch 50 which couples the color locating signal S3 or the color modifying signal S4 to summing circuit 18. Signal S8 is produced by a masking control unit 49 which is coupled to receive vertical and horizontal timing signals from terminal 10. The function of unit 49 is to enable gate 48 during selected time periods corresponding to areas of the displayed image where color modification is desired (S8 High) and disable gate 48 in other areas (S8 Low) thereby masking areas where color changes are not desired. Selection of the coupled signal is provided by a single pole three position mode control switch 52 having an output coupled via switch 50 to summing unit 18, a first input (A) for receiving the color modifying signal S4, a second input (B) coupled to ground and a third input (C) coupled to the output of a 500KHz oscillator 53 for receiving the color locating signal S3.

The color modifying signal S4 has quadrature related saturation and hue modifying components, each being of controllable amplitude and polarity, and is derived from the color phase reference signal S5. The saturation component, S10, is provided by a phase splitter transistor 60 having a base electrode coupled directly to node A and collector and emitter electrodes coupled via equal valued load resistors 62 and 64 to respective sources of positive (+) and negative (−) supply voltage. A potentiometer 66, coupled to the collector and emitter electrodes, provides a saturation modifying component S10 which is in phase with signal S5 for settings of the wiper nearer the emitter electrode (CCW rotation) and which is out of phase with signal S5 for wiper settings nearer the collector electrode (CW). The oppositely phased signals applied to the potentiometer cancel at the central position of the resistive element.

The hue modifying component S11 of signal S4 is produced by phase splitter transistor 70 having a base electrode coupled via a delay element 71 to node A and having collector and emitter electrodes coupled to positive (+) and negative (−) supply voltage sources via respective equal valued load resistors 72 and 74. The delay of equipment 71 is selected to provide 90 degrees of phase shift at the color subcarrier reference signal frequency. Signal S11 is obtained from the wiper of a hue control potentiometer 76A coupled to the collector and emitter electrodes of transistor 70. For settings of the wiper nearer the emitter electrode of transistor 70 (CCW), the hue modifying component S11 lags component S10 by 90 degrees. When the wiper is nearer the collector electrode (CW), component S11 remains in phase quadrature with component S10 but leads by an angle of 90 degrees.

The quadrature related hue and saturation control components S11 and S10 are combined in a summing circuit 80 and the resultant color modifying signal S4 is applied to the "A" contact of mode control switch 52. When switch 52 is in position "A" (the modify mode) signal S4 is coupled via switch 50 to summing circuit 18 when control signal S9 is present. The component S10 of signal S4 will be either in phase or out of phase with the chrominance component of the composite video input signal depending on the setting of potentiometer 60. When component S10 is added to signal S1, only the amplitude of the chrominance component of the resultant signal S2 will change. One may thus increase the saturation level of the processed video signal by rotating potentiometer 66 in the counter clockwise direction (CCW) or decrease the saturation level by rotating the potentiometer in the clockwise (CW) direction. For either case, a change in saturation level of the processed signal does not alter the hue since the vectors which are added are always either directly aligned or directly opposed.

Figure 2:
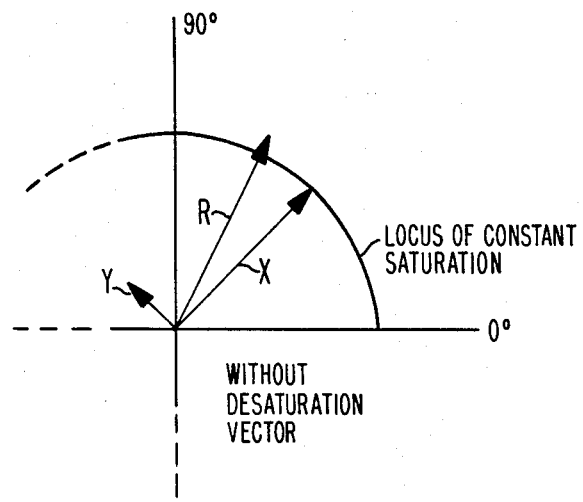
FIGS. 2a and 2b are a vector diagrams illustrating certain aspects of operation of the apparatus of FIG. 1.
Figure 2:
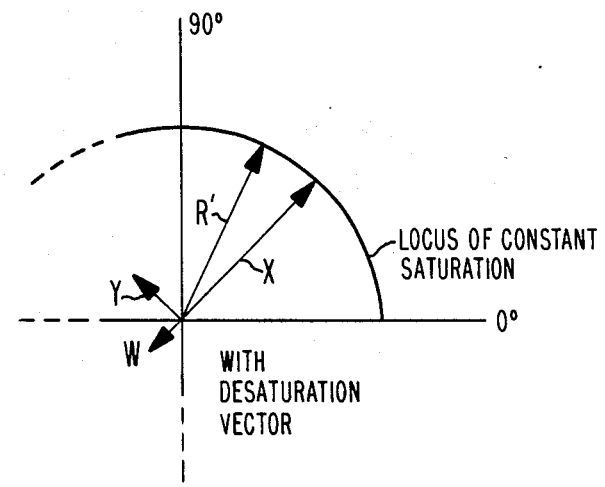

Component S11 is in quadrature with the chrominance component of the composite video input signal and thus modifies the hue of the processed output signal in much the same way as component S10 modifies the saturation level. One significant difference, however, is that a change in the hue modifying component S11 will tend to alter the saturation level of the processed video output signal. This problem is illustrated in FIG. 2a where a vector, X, is rotated by the addition of a quadrature related vector Y. As seen, the resultant rotated vector, R, is of greater amplitude than the original vector X. If vector X represents the chrominance component of the composite video input signal, it is apparent that any attempt to alter its hue (phase) by adding a quadrature related vector (Y) to it will necessarily also increase its saturation level. This undesirable effect may be avoided as shown in FIG. 2b by adding a desaturation vector W of appropriate amplitude to vectors X and Y such that the resultant vector R' lies on the locus of constant saturation (a circle) defined by the original vector X. The remaining elements of FIG. 1 comprise a saturation corrector circuit 90 which provides a further saturation modifying component S12 which opposes a tendency for increases in the amplitude of the hue modification component S11 to cause an increase in the saturation level of the chrominance component of the composite video output signal S2.

The saturation corrector comprises a calibration potentiometer 91 coupled between the output of potentiometer 76A and ground. A phase splitter transistor 92 is coupled at base electrode thereof to the wiper of potentiometer 91 via a 90 degree delay element 93. The collector and emitter electrodes of transistor 92 are coupled via respective load resistors 94 and 95 to sources of positive (+) and negative (−) supply potential. A potentiometer 76B is coupled to the collector and emitter electrodes of transistor 92 and supplies component S12 to a further input of summing circuit 80. The wiper of potentiometer 76B is mechanically coupled to that of potentiometer 76A (as indicated by a phantom line) so as to advance the wiper towards the collector of transistor 92 for clockwise (CW) rotation.

In operation, delay elements 71 and 93 impart a total of 180 degrees of phase shift to component S12 relative to the color phase reference signal S5. Since potentiometers 76A and 76B are "ganged" together, the phase angle of component S12 remains at 180 degrees as the potentiometers are rotated. For example, if both are placed in their clockwise positions the inversion provided by transistor 70 is effectively cancelled by the additional inversion provided by transistor 92. At the counter clockwise position, neither of transistors 70 and 92 inverts component S12. Since potentiometers 76A and 76B are effectively cascade connected, the amplitude of component S12 varies as a function of the square of the hue correction component S11. If, for example, component S11 is reduced by a factor of two, then the component S12 will be reduced by a factor of 4. Potentiometer 91 is provided to adjust the level of component S12 to a value such that the modified chrominance signal remains on the locus of constant saturation as the hue control potentiometer is varied. This adjustment may be made with the aid of a color bar generator and a vector scope.

Figure 3:
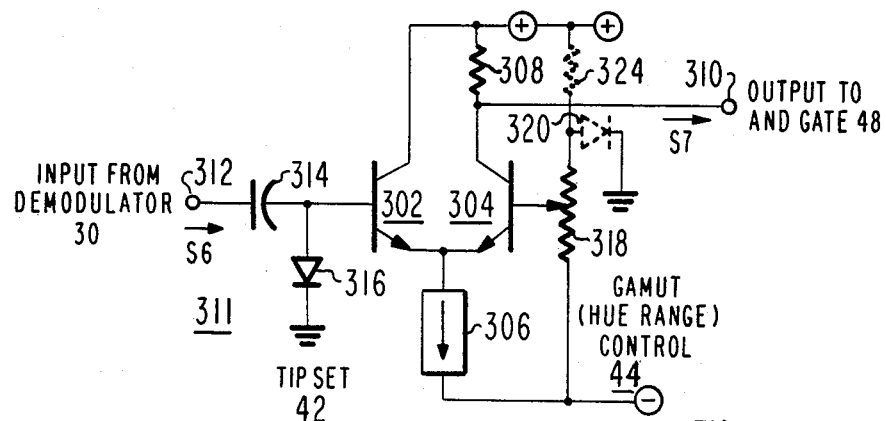
FIG. 3 is a circuit diagram of a portion of the apparatus of FIG. 1.

FIG. 3 provides an example of a specific circuit suitable for providing the tip setting and gamut control function of units 42 and 44 of FIG. 1. The circuit includes a pair of emitter coupled transistors 302 and 304 having emitter electrodes coupled to a negative supply voltage source (−) via a current source 306 and collector electrodes coupled to a source (+) of positive supply voltage. The collector circuit of transistor 304 includes a load resistor 308 for developing the color identification signal S7 thereacross and an output terminal 310 for supplying signal S7 to gate 48. The base of transistor 302 is coupled to an input terminal 312 via a clamp circuit 311 which includes a capacitor 314 for receiving signal S6 from demodulator 30 and which is coupled to ground via a diode 316. A potentiometer 318 is coupled between ground and the negative supply provides variable DC bias for the base of transistor 304. Bias for transistor 302 may be obtained from a high impedance source (not shown).

In operation, capacitor 314 removes the DC component of signal S6 and diode 316 provides a path for limiting the base potential of transistor 302 to a few hundred millivolts above ground potential. The overall effect is to establish a new DC level for signal S6 in which positive peaks are "set" or coupled to ground level. Transistors 302 and 304 act as a variable amplitude threshold detector with the threshold level being controlled by potentiometer 318. With the potentiometer set at its highest level (ground), transistor 302 will turn on and transistor 304 will turn off only when the demodulated chrominance signal (S6) is at or very near its peak value representative of a specific color as determined by the setting of phase shift networks 38 and 40. In this condition the gamut or range of colors which will be modified is very narrow. By adjusting potentiometer 318 to a more negative setting the threshold of the comparator formed by transistors 302 and 304 is lowered thereby increasing the color detection range and thus broadening the spectrum of modifiable colors. The response gamut may be further narrowed, if desired, by adding a diode 320 and resistor 324 as illustrated in phantom.

Figure 4:
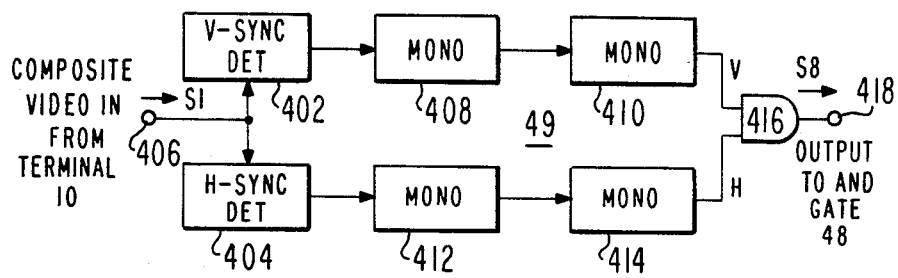
FIG. 4 is a block diagram of a masking control unit suitable for use in the apparatus of FIG. 1.

FIG. 4 is a block diagram of masking control unit 49 for controlling the color identification signal gate 48. The unit comprises a vertical sync detector 402 and a horizontal sync detector 404 having respective inputs coupled to terminal 406 for receiving the composite video signal S1 and outputs coupled via respective cascade connected monostable multivibrators 408-414 to respective inputs of an AND gate 416 which supplies the masking control signal S8 to an output terminal 418 for connection to gate 48.

In operation, detector 402 triggers multivibrator 408 at the beginning of each field to provide an output pulse which triggers multivibrator 410. Detector 404 triggers multivibrators 412 and 414 in a similar manner during each horizontal line. Gate 416 is enabled when multivibrators 410 and 414 are currently in their quasi-stable states and is disabled at all other times. When enabled, gate 416 primes gate 48 which couples the color identification signal to switch 50 thereby defining a "window" so to speak, in the displayed image where color modification will take place. The vertical and horizontal positions of the window are controlled by the adjustment of the time periods of multivibrators 408 and 412, respectively. The width and height of the window are controlled by adjustment of the time periods of multivibrators 410 and 414, respectively. When gate 416 is disabled, gate 48 is also disabled thereby blocking the passage of the color identification signal to switch 50 and effectively preventing any addition of the color modifying or color locating signals to the composite video input signal. The masking effect thus provided enables one to alter selected colors within a specific area of the displayed image without altering the same colors in other image areas.

As previously mentioned, plural colors may be selectively modified by cascading processors with essentially no signal degradation since the main signal path includes only non-frequency selective linear elements. The arrangement of FIG. 5 accomplishes this same task with fewer elements wherein plural processing units 601, 602 and 603 share a common main signal path (elements 10-20), bandpass filter 32, limiter 34 and color subcarrier reference signal input terminal 36. Units 601-603 may be identical, each comprising individual color control, masking and color locating circuits. Operation of each individual unit is the same as that previously described with the exception that the shared elements (10, 12, 16-20, 32-36) are not duplicated. Various advantages of this arrangement for plural color modification over cascading include improved reliability and a constant signal delay through the main signal path regardless of the number of color modification stages added.

Various changes may be made to the examples of the invention herein shown and described. It will be appreciated, for example, that the analog elements may be replaced by equivalent digital elements if desired. Also, the order in the cascade connection of switches 50 and 52 may be reversed and timing elements, such as monostable multivibrators, may be replaced by appropriate counter circuits. A computer may be used, if desired, for automatically changing the various control settings on a programmed basis. One could, for example, preview a program source tape to determine the processor settings at various SMPTE time code locations and load the computer memory with the setting and time code information to effect automatic correction of the composite video signal when the tape is next played. It will be further appreciated that delays in the chrominance signal processing path may be compensated for in the main (composite) video signal path by including an appropriate delay in amplifier 16 to ensure proper registration of the correcting signal with the area being corrected.

What is claimed is:

1. Apparatus for modifying the chrominance component of a composite video input signal, comprising:
   first means for providing a color phase reference signal having a given phase angle with respect to the burst component of said video input signal;
   second means for providing a color identification signal when the phase angle of said chrominance component lies within a predetermined range of values of said given phase angle;
   third means comprising a first amplitude and polarity control network responsive to said color phase reference signal for providing a color saturation modifying signal and a second amplitude and polarity control network responsive to said color phase reference signal for providing a hue modifying signal, each modifying signal being of independently controllable amplitude and independently controllable polarity; and
   fourth means for coupling said composite video input signal to an output terminal and for adding said color saturation modifying signal and said hue modifying signal to the coupled signal when said color identification signal is present to provide a modified composite video output signal at said output terminal in which the saturation and the hue of selected colors represented by the chrominance component of said modified composite video output signal may be independently controlled by said first and second networks, respectively.

2. Apparatus as recited in claim 1 further comprising masking means responsive to selected timing components of said composite video input signal for effectively inhibiting the addition of said color modifying signal to said coupled signal during selected time periods of each field of said composite video input signal.

3. Apparatus for modifying the chrominance component of a composite video input signal, comprising:
first means for providing a color locating signal having a frequency different from that of the burst component of said input signal;
second means for providing a color phase reference signal having a frequency equal to that of said burst component and having a given phase angle relative thereto;
third means for providing a color identification signal when the phase angle of said chrominance component lies within a predetermined range of values of said given phase angle;
fourth means responsive to said color phase reference signal for providing a color modifying signal having quadrature related components, each being of controllable amplitude and polarity; and
fifth means for coupling said composite video signal to an output terminal and for selectively adding one of said color locating and said color modifying signal to the coupled signal when said color identification signal is present.

4. Apparatus as recited in claim 3 further comprising:
first circuit means responsive to vertical and horizontal timing components of said composite video input signal for providing a masking signal during selected vertical and horizontal time periods; and
second circuit means coupled to said fifth means and responsive to said masking signal for effectively preventing the addition of either of said color locating and said color modifying signals to said coupled signal during said selected time periods.

5. Apparatus as recited in claim 3 wherein said quadrature related components of said color modifying signal comprise a hue modification component and a saturation modification component and further comprising means for adding a further component to said color modifying signal for opposing a tendency for changes in the amplitude of said hue modification component to cause corresponding changes in the saturation level of the chrominance component of said coupled signal.

6. Apparatus as recited in claim 3 wherein said first means comprises a source of oscillations having a frequency within the luminance frequency band of said composite video input signal.

7. Apparatus as recited in claim 3 wherein said second means comprises:
input means for receiving a color subcarrier reference frequency signal having a predetermined phase angle relative to said burst component; and
phase shift means for altering the phase of said color subcarrier signal over a range of substantially 360 degrees to provide said color phase reference signal.

8. Apparatus as recited in claim 3 wherein said third means comprises:
filter means for separating said chrominance component from said composite video input signal;
demodulator means responsive to said color phase reference signal for demodulating said separated chrominance component; and
variable threshold amplitude detection means responsive to the demodulated chrominance component for providing said color identification signal.

9. Apparatus as recited in claim 8 wherein said third means further comprises limiter means for limiting the amplitude of the separated chrominance component prior to demodulation thereof by said demodulator means.

10. Apparatus for modifying the chrominance component of a composite video input signal, comprising:
first means for providing a color phase reference signal having a given phase angle with respect to the burst component of said video input signal;
second means for providing a color identification signal when the phase angle of said chrominance component lies within a predetermined range of values of said given phase angle;
third means responsive to said color phase reference signal for providing a color modifying signal having quadrature related saturation and hue modifying components, each modifying component being of controllable amplitude and polarity;
fourth means for coupling said composite video input signal to an output terminal and for adding said color modifying signal to the coupled signal when said color identification signal is present to provide a modified composite video output signal at said output terminal;
a source for providing a color locating signal having a frequency different from that of said color phase reference signal; and
switch means in said fourth means for effectively substituting said color locating signal for said color modifying signal.

11. Apparatus as recited in claim 10 further comprising masking means responsive to selected timing components of said composite video input signal for effectively inhibiting the addition of either of said color modifying and color locating signals to said coupled signal during selected time periods of each field of said composite video input signal.

12. Apparatus for modifying the chrominance component of a composite video input signal, comprising:
first means for providing a color phase reference signal having a given phase angle with respect to the burst component of said video input signal;
second means for providing a color identification signal when the phase angle of said chrominance component lies within a predetermined range of values of said given phase angle;
third means responsive to said color phase reference signal for providing a color modifying signal having quadrature related saturation and hue modifying components, each modifying component being of controllable amplitude and polarity;
fourth means for coupling said composite video input signal to an output terminal and for adding said color modifying signal to the coupled signal when said color identification signal is present to provide a modified composite video output signal at said output terminal; and
means for adding a further saturation modifying component to said color modifying signal for opposing a tendency for increases in the amplitude of said hue modification component to cause an increase in the saturation level of the chrominance component of said composite video output signal.

13. Apparatus for modifying the chrominance component of a composite video input signal, comprising:
- first means for providing a color phase reference signal having a given phase angle with respect to the burst component of said video input signal;
- second means for providing a color identification signal when the phase angle of said chrominance component lies within a predetermined range of values of said given phase angle;
- third means responsive to said color phase reference signal for providing a color modifying signal having quadrature related saturation and hue modifying components, each modifying component being of controllable amplitude and polarity;
- fourth means for coupling said composite video input signal to an output terminal and for adding said color modifying signal to the coupled signal when said color identification signal is present to provide a modified composite video output signal at said output terminal; and wherein said first means comprises:
- input means for receiving a color subcarrier reference frequency signal having a substantially fixed phase angle with respect to said burst component; and
- phase shift means for altering the phase of said reference frequency signal over a range of substantially 360 degrees to provide said color phase reference signal.

14. Apparatus for modifying the chrominance component of a composite video input signal, comprising;
- first means for providing a color phase reference signal having a given phase angle with respect to the burst component of said video input signal;
- second means for providing a color identification signal when the phase angle of said chrominance component lies within a predetermined range of values of said given phase angle;
- third means responsive to said color phase reference signal for providing a color modifying signal having quadrature related saturation and hue modifying components, each modifying component being of controllable amplitude and polarity;
- fourth means for coupling said composite video input signal to an output terminal and for adding said color modifying signal to the coupled signal when said color identification signal is present to provide a modified composite video output signal at said output terminal; and wherein said second means comprises:
- filter means for separating said chrominance component from said composite video input signal;
- demodulator means responsive to said color phase reference signal for demodulating said chrominance component; and
- variable threshold amplitude detection means responsive to the demodulated chrominance component for providing said color identification signal.

15. Apparatus as recited in claim 14 wherein said second means further comprises limiter means for limiting the amplitude of the separated chrominance component prior to demodulation thereof by said demodulation means.

* * * * *